(12) United States Patent
Romani et al.

(10) Patent No.: US 8,113,543 B1
(45) Date of Patent: Feb. 14, 2012

(54) HOSE ADAPTER AND ASSEMBLY INCORPORATING THE SAME

(75) Inventors: Domenic A. Romani, Indiana, PA (US); Ruthe M. Romani, Indiana, PA (US); Frank D. Romani, Saltsburg, PA (US)

(73) Assignee: M.D.C. Romani, Inc., Indiana, PA (US)

( * ) Notice: Subject to any disclaimer, the term of this patent is extended or adjusted under 35 U.S.C. 154(b) by 719 days.

(21) Appl. No.: 12/202,481

(22) Filed: Sep. 2, 2008

(51) Int. Cl.
*A47L 9/24* (2006.01)

(52) U.S. Cl. .................. 285/7; 285/417; 15/419

(58) Field of Classification Search ........... 285/7, 334.1, 285/417, 391
See application file for complete search history.

(56) References Cited

U.S. PATENT DOCUMENTS

| | | | | |
|---|---|---|---|---|
| 1,203,546 | A * | 10/1916 | Parsons ................... | 285/391 |
| 2,827,311 | A * | 3/1958 | Kasper ................. | 285/7 |
| 3,565,464 | A * | 2/1971 | Wolf .................. | 285/7 |
| 4,099,744 | A * | 7/1978 | Kutnyak et al. ............ | 285/7 |
| 4,174,858 | A * | 11/1979 | Brooks ............... | 285/7 |
| 4,558,889 | A * | 12/1985 | Gans .................. | 285/7 |
| 4,625,998 | A * | 12/1986 | Draudt et al. ............. | 285/7 |
| 4,747,621 | A * | 5/1988 | Gans et al. ............... | 285/7 |
| 4,758,023 | A * | 7/1988 | Vermillion ............. | 285/7 |
| 4,964,189 | A * | 10/1990 | Rau et al. .............. | 285/7 |
| 4,997,209 | A * | 3/1991 | McGrath et al. ........... | 285/7 |
| 5,042,844 | A * | 8/1991 | Iida et al. .............. | 285/7 |
| 6,378,166 | B1 * | 4/2002 | Bruno et al. ............. | 285/7 |
| 6,478,342 | B1 * | 11/2002 | Berfield ............... | 285/7 |
| 6,782,846 | B1 | 8/2004 | Porter et al. | |
| 6,893,050 | B2 * | 5/2005 | Schiemann et al. .......... | 285/7 |
| 6,908,122 | B1 * | 6/2005 | Bristor ................ | 285/7 |
| 7,234,733 | B2 * | 6/2007 | Valentini .............. | 285/7 |
| 7,527,305 | B2 * | 5/2009 | Hyslop ................ | 285/7 |
| 7,617,566 | B2 * | 11/2009 | Chapman et al. .......... | 285/7 |

* cited by examiner

*Primary Examiner* — David E Bochna
(74) *Attorney, Agent, or Firm* — Eckert Seamans et al.; Arnold B. Silverman, Esq.

(57) ABSTRACT

A hose adapter defines a passageway therethrough and has a first connector portion and a second connector portion with the first connector portion being substantially larger in transverse dimension than the second connector portion. A transition portion is disposed between the first and second connector portions. A vacuum device is operatively associated with one of the first and second connector portions, and a hose is secured to the other connecting portion. In one embodiment, the hose adapter has a vent with an associated closure, which is designed to vary the opening in the vent and thereby alter the amount of suction created by the vacuum device. A plurality of interiorly-mounted, inwardly-projecting ribs are provided in the second connector portion to facilitate retention of a hose therein. A vacuum system employing the adapter is disclosed.

24 Claims, 7 Drawing Sheets

HOSE ADAPTER AND ASSEMBLY INCORPORATING THE SAME

BACKGROUND OF THE INVENTION

1. Field of the Invention

The present invention relates to an improved hose adapter and an assembly incorporating the same, and more specifically, it relates to such apparatus, wherein a vacuum assembly for use in an animal grooming apparatus, as well as numerous other uses, is provided.

2. Description of the Prior Art

It has been known to use various forms of handheld, unpowered tools in grooming animals, including domestic animals, such as dogs and cats. At the simplest level, handheld brushes and combs are employed. Similarly, cutting devices to trim animal hair without damaging the animal have been known.

It has also been known to employ handheld, rake-type devices to manually gather loose hair of animals after which hand withdrawal of the hair from the rake and discarding of the hair has been performed. See generally U.S. Pat. No. 6,782,846.

Co-pending U.S. patent application Ser. No. 12/113,427 entitled "Vacuum Rake for Animal Grooming and Associated Vacuum System" discloses a manually-held raking device, which has a tubular handle adapted to be connected to a vacuum source. This results in the hair being freed by the rake under the influence of a vacuum being withdrawn from the rake teeth or blades and being delivered to the vacuum source. This eliminates the need for manual withdrawal of the hair from the rake.

Inherent in such systems is the need to provide suitable tubing to connect the handheld grooming device with the vacuum source such that the vacuum source can draw the freed hair away from the grooming tool and into the desired storage region with subsequent disposal being provided for. Such systems require effective coupling between the connecting hose and the grooming tool on the one hand and the vacuum source and the hose on the other.

There remains a need for an improved hose adapter and related assembly for providing efficient communication between a vacuum source and a tool or other device, wherein suction is to be applied with an air hose connecting the same.

SUMMARY OF THE INVENTION

The present invention has met the hereinbefore-described needs.

In one embodiment of the present invention, a hose adapter assembly includes a hose adapter defining a passageway therethrough and having a first connector portion and a second connector portion. The first connector portion has a substantially larger transverse dimension than the second connector portion. A transition portion is disposed between the first connection portion and the second connector portion. A vacuum device is operatively associated with one of the first connector portion and the second connector portion, and a hose is secured to the other of the first connector portion and the second connector portion. This permits the vacuum device to draw air through the hose, through the hose adapter, and into the vacuum device.

In one embodiment of the present invention, the first connector portion is connected directly or indirectly to the vacuum device, and the hose is connected to the second connector portion.

In another embodiment of the present invention, the interior surface of the second connector portion has a plurality of spaced, inwardly-projecting ribs which serve to engage the hose portion which extends into the second connector portion and retain the same in place. If desired, an adhesive may be employed to enhance the retention of the hose within the second connector portion.

In another aspect of the present invention, a vent opening is formed in the wall of the hose adapter, preferably in the second connector portion, and a movable closure is provided to permit the vent to be fully opened or partially or totally closed, thereby facilitating an adjustment to the suction provided by the apparatus employing the hose coupling.

It is an object of the present invention to provide a hose coupling which simply and efficiently permits effective connection between elements of a system of different diameter.

It is another object of the present invention to provide a coupling adapter which easily facilitates connecting a pair of air hoses or an air hose with another system component, such as a vacuum device, while accommodating differences in dimension and maintaining the desired intimacy of passageway to facilitate vacuum generation.

It is a further object of the present invention to provide such a hose adapter usable in an assembly which is structured to provide a connection between an animal grooming tool and a vacuum device.

It is another object of the present invention to provide such an adapter which has a vent opening and cooperating closure to facilitate adjustment of the amount of suction provided.

It is another object of the present invention to provide a hose adapter which provides an interior rib construction to facilitate effective retentive connection between the adapter and a hose.

It is yet another object of the present invention to provide a hose adapter assembly employing such a hose adapter.

These and other objects of the present invention will be more fully understood in the following detailed description of the invention on reference to the illustrations appended hereto.

BRIEF DESCRIPTION OF THE DRAWINGS

FIGS. 8(*a*) and 8(*b*) show, respectively, a portion of the wall of the second connector portion with the vent closure covering the vent and the vent closure leaving the vent open, respectively.

DESCRIPTION OF THE PREFERRED EMBODIMENTS

As employed herein, the term "vacuum device" means apparatus structured to draw air into it to create a partial vacuum and shall expressly include, but not be limited to, portable vacuum units and built-in, central vacuum systems.

The term "animal," as employed herein, will include, but not be limited to, domestic animals, such as dogs and cats, for example, farm animals, such as horses and goats, for example, and certain zoo animals.

In the following description of the invention, like reference characters designate like or corresponding parts throughout the several views of the drawings. Also, it will be understood that relative, directional terms, such as "forward," "rearward," "upwardly," "downwardly," and the like, are employed for convenience of disclosure and are not to be construed as limiting terms.

Figure 1:
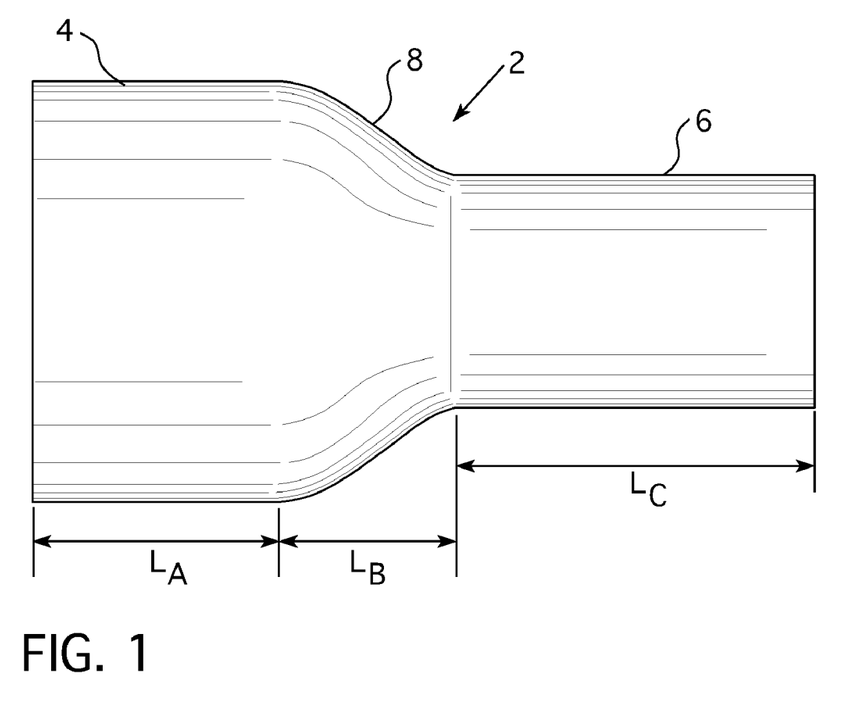
FIG. 1 is a front elevational view of a form of hose adapter of the present invention which, in this embodiment, is preferably substantially symmetrical about its longitudinal axis.

Referring to FIG. 1, there is shown a hose coupling 2 of the present invention. The hose coupling 2 has a first connector portion 4, a second connector portion 6, and a transitional portion 8. In this embodiment, the exterior of the hose adapter is preferably substantially symmetrical about its longitudinal axis. As shown, the first connector portion 4 has a longitudinal extent $L_A$ which may be about 1 inch to 1½ inches. The transitional portion 8 has a longitudinal extent $L_B$ which may be about ¾ to 1½ inches. The second connector portion 6 has longitudinal extent $L_C$ of about 1¾ inches to 2¼ inches.

Figure 2:
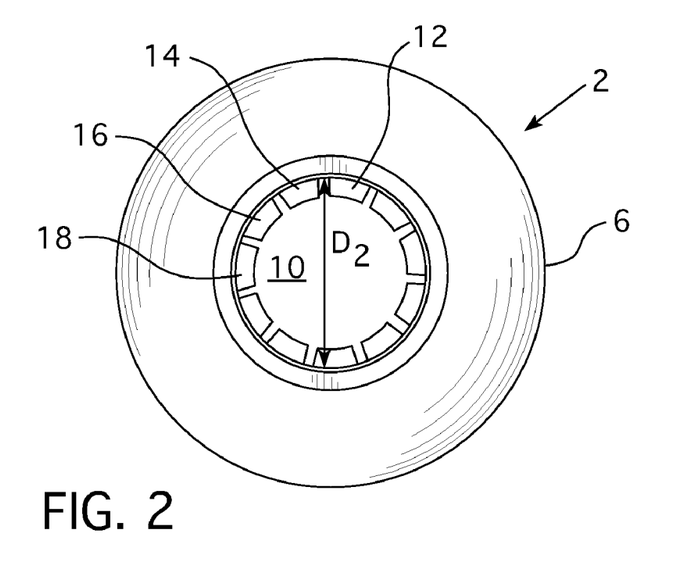
FIG. 2 is a right-side elevation of the hose adapter shown in FIG. 1.
Figure 3:
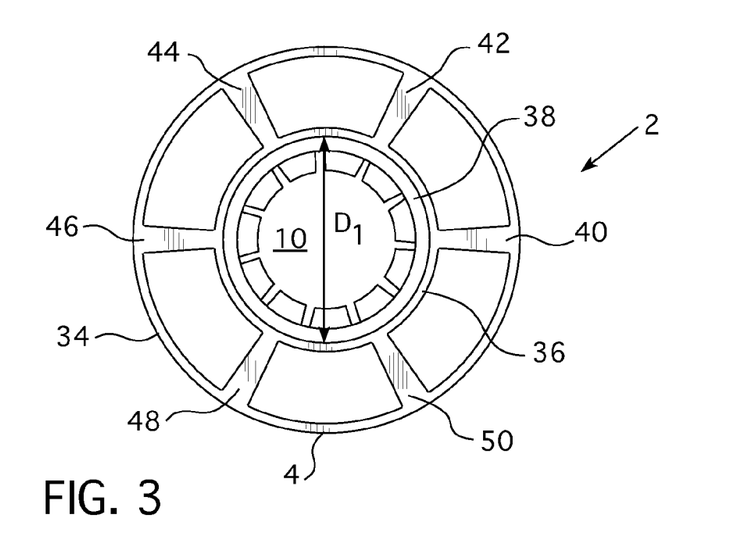
FIG. 3 is a left-side elevation of the hose adapter shown in FIG. 1.

Referring to FIGS. 1 through 3, it will be seen that the first connector portion 4 and second connector portion 6 each have a generally circular, exterior configuration. The diameter $D_1$ of the opening or passageway portion contained within the first connector portion 4 is larger than the diameter $D_2$ of the internal passageway portion of second connector portion 6. The ratio of diameter $D_1$ to $D_2$ may be about 100 percent to 120 percent, and preferably about 105 percent to 115 percent.

Figure 4:
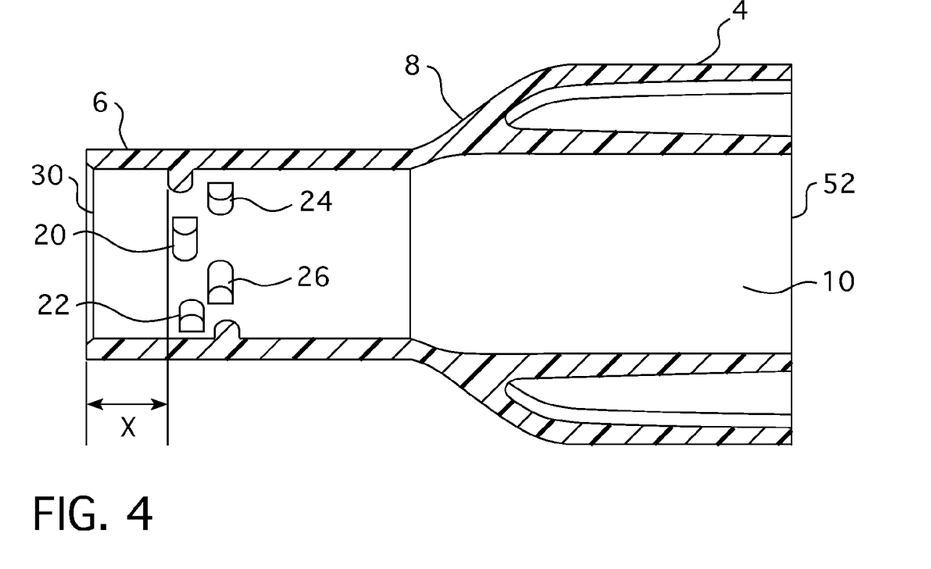
FIG. 4 is a cross-sectional illustration of an adapter, such as is shown in FIGS. 1 through 3.

Referring to FIGS. 2 and 4, it will be seen that the second connector portion 6 has, within the passageway 10, a plurality of generally radially, inwardly-projecting, circumferentially, relatively-spaced ribs, such as 12, 14, 16, 18, for example, shown in FIG. 2. These ribs 12, 14, 16, 18 project generally inwardly and extend circumferentially about passageway 10. As shown in the cross-sectional view of FIG. 4, a first series of ribs, such as 20, 22, for example, are in relatively-spaced position with respect to each other and are at generally the same axial position within passageway 10, and a second set of ribs, such as 24, 26, for example, are in relatively-spaced position with respect to each other and are at a different axial position from the first set of ribs 20, 22, as well as being staggered with respect thereto, so as to create the effect of a discontinuous thread. In a preferred embodiment, each of these ribs may have an axial width of about 0.10 inch to 0.30 inch and a circumferential extent of about 0.10 inch to 0.35 inch.

Referring still to FIG. 4, the first set of ribs 20, 22 are also preferably spaced a distance X, which is preferably about 0.40 inch to 0.60 inch from the free end 30 of the adapter 2. In this manner, a hose may be inserted into the passageway at the free end 30 and be placed in mechanical interengagement with ribs, such as 20, 22, 24, 26, for example. This will serve to effectively retain the hose therein. The other end of the hose (not shown in this view) may be operatively associated with an animal grooming instrument.

In the form shown in FIGS. 2 and 4, the ribs, with examples thereof, which are labeled 12, 14, 16, 18, 20, 22, 24, 26, in each row preferably are relatively spaced from each other and extend throughout the internal circumference of the adapter.

Referring now to FIGS. 3 and 4, it will be seen that the first connector portion 4 has an outer, generally circular wall 34 and a concentric, inner wall 36, which defines a portion of the passageway 10. Also shown in this view is a portion of the transition wall 38 between the smaller, internal diameter $D_2$ of the second connector portion 6 and internal diameter $D_1$ of first connector portion 4. A plurality of generally radially oriented stiffening members 40, 42, 44, 46, 48, 50 connect the outer wall 34 with the inner wall 36. The end opening 52 adjacent the first connector portion 4 permits insertion of a hose into first connector portion 4 or direct connection of first connector portion 4 with a fitment in a vacuum unit or system.

It will be appreciated, as will be described more fully hereinafter, that when the first connector portion 4 is operatively associated with a vacuum unit or system and the second connector portion 6 is operatively associated with an animal grooming tool or device, initiation of flow from the animal grooming tool through the passageway 10 to the vacuum unit or system will provide an efficient and unburdensome means of withdrawing freed hair from the animal and disposing of the same without requiring manual removal thereof from a rake or blade which facilitates the separation of the hair from the animal.

Figure 5:
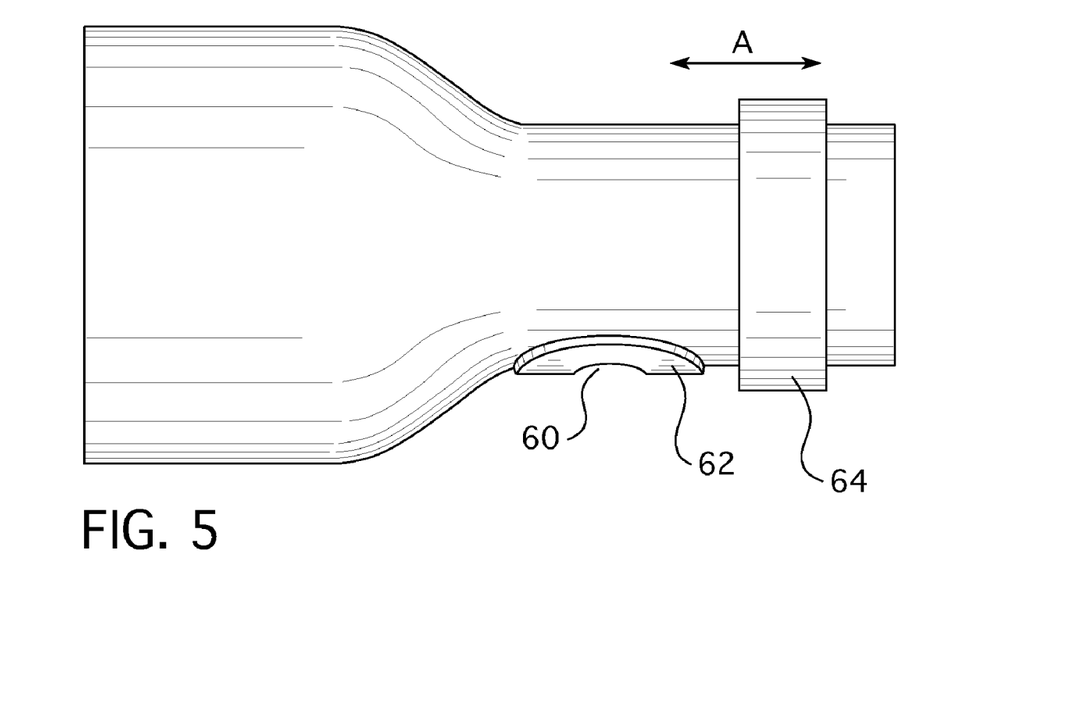
FIG. 5 is a front elevational view of a modified form of hose adapter of the present invention having a vent.
Figure 6:
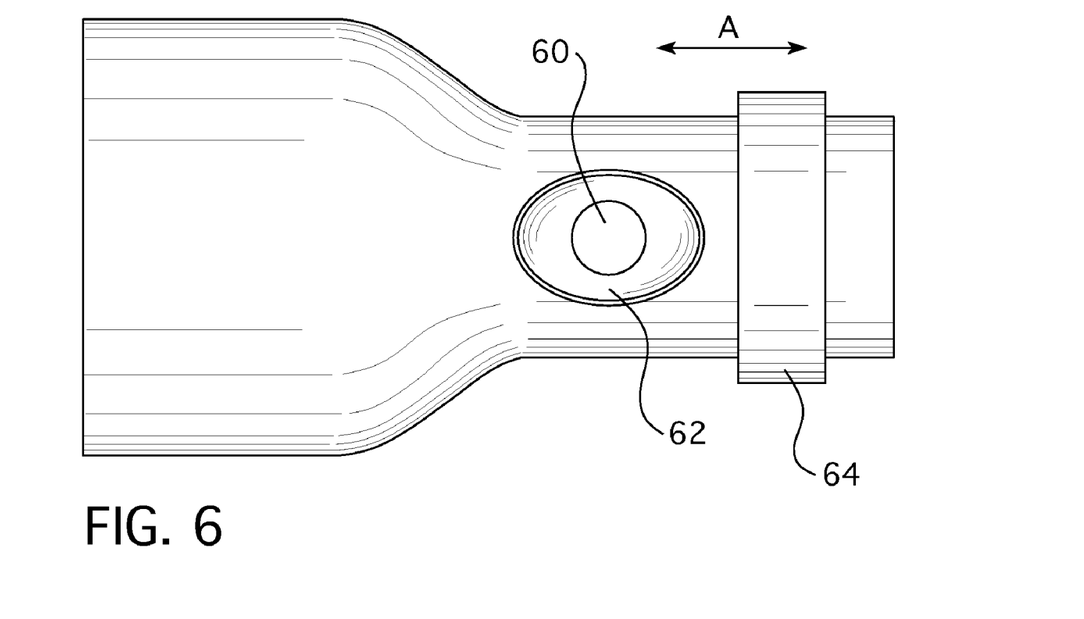
FIG. 6 is another elevational view of the embodiment of FIG. 5 showing the vent.
Figure 7:
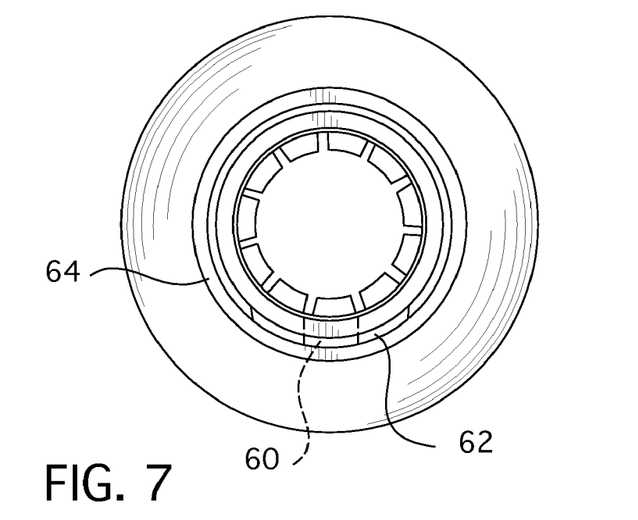
FIG. 7 is a right-side elevation of the embodiment of FIG. 5.

Referring now to FIGS. 5 through 7, a further feature of the invention will be considered. The present invention may have a vent opening in the body of the hose adapter such that allowing it to be fully opened, closing it fully, or closing it partially through the use of a finger or a closure provides added control regarding the degree of suction applied. In the form shown in FIGS. 5 through 7, a vent opening 60 is positioned within a generally oval-shaped, raised portion 62 which surrounds vent opening 60. In this embodiment, a sleevelike closure 64 which extends around at least a major portion of the exterior of the second connector portion 6 and preferably continuously therearound may be moved axially in the direction indicated by two-headed arrow A into position where it totally or partially overlies the vent opening 60 and obstructs vent opening 60 or is totally removed from the vent opening 60. The sleeve 64 is preferably secured in the desired position overlying all or a portion of vent opening 60 by friction fit. The sleeve 60, which may be made of a suitable plastic material, preferably has a width of about 1 inch to 1½ inches and an inside diameter of about 0.70 inch to 1.0 inch.

Figure 8A:
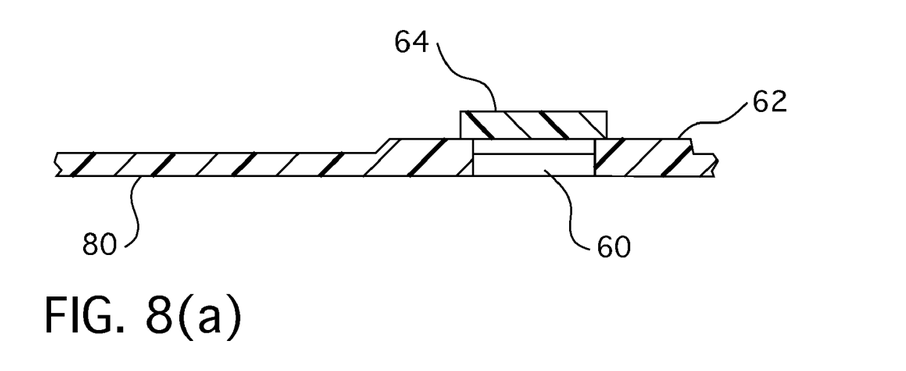
Figure 8B:
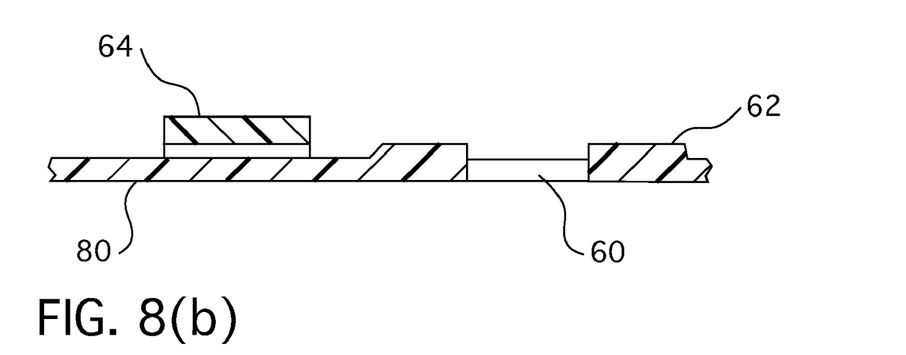

Referring to FIGS. 8(a) and 8(b), there is shown, in section, the portion of the hose adapter body 80 containing the vent opening 60 with the surrounding annular, raised portion 62. In FIG. 8(a), the closure 64 is shown in a vent closed position overlying opening 60 in intimate contact therewith. The raised, annular portion 62, combined with the internal surface of the closure 64, which is preferably annular and continuous, serves to maintain an intimate connection. FIG. 8(b) shows the closure which is of greater internal diameter than the external diameter of the body portion 80 in the vent open position.

Figure 9:
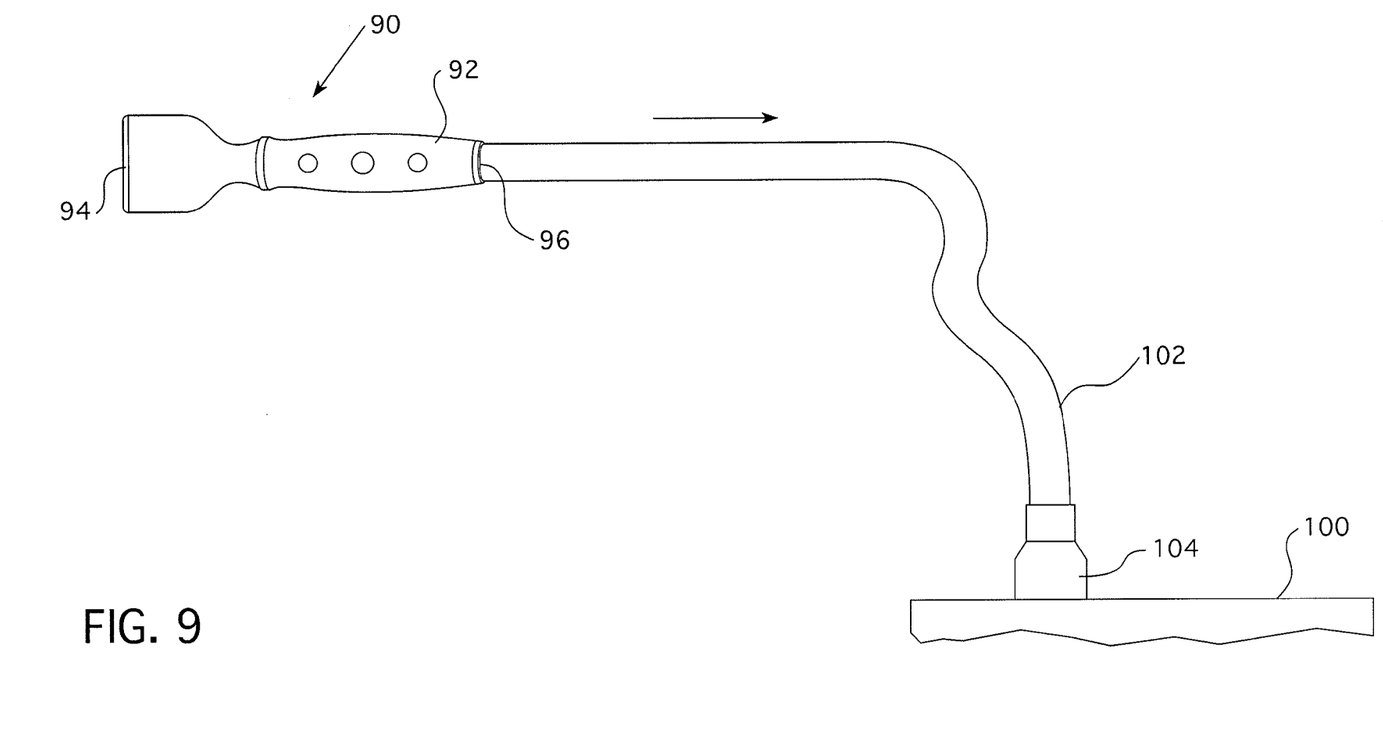
FIG. 9 is a schematic illustration of an animal grooming rake operatively associated with a vacuum system.

Referring now to FIG. 9, there is shown a hose adapter assembly. In the form shown, an animal grooming tool 90 has a grip portion 92 and a comb or rake portion 94. The grooming tool 90 has a tubular body such that hair freed from the animal by the comb or rake 94, for example, will pass through the grooming tool under the influence of vacuum in a manner to be described and exit the device at end 96. Vacuum 100, which may, for example, be a vacuum unit which is portable or a permanently-installed vacuum system, is operatively associated with the grooming tool 90 through hose 102, which has a first end secured to the vacuum by a fitment 104, which may provide for frictional retention. The other end of the hose is inserted into, or otherwise operatively coupled to, the grooming tool 90.

Figure 10:
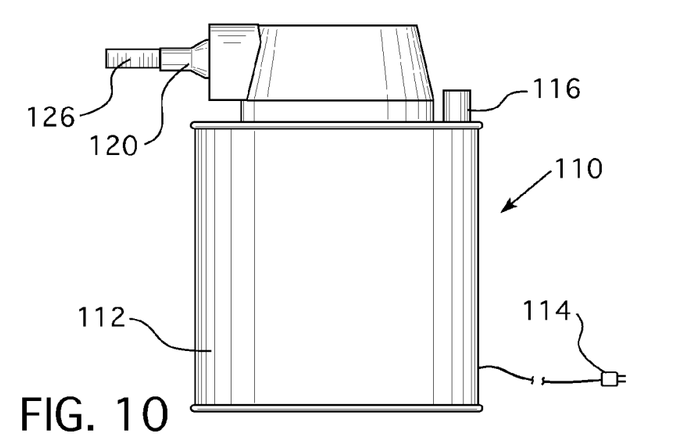
FIG. 10 is an elevational view of a form of portable vacuum device having a hose adapter of the present invention operatively associated therewith.
Figure 11:
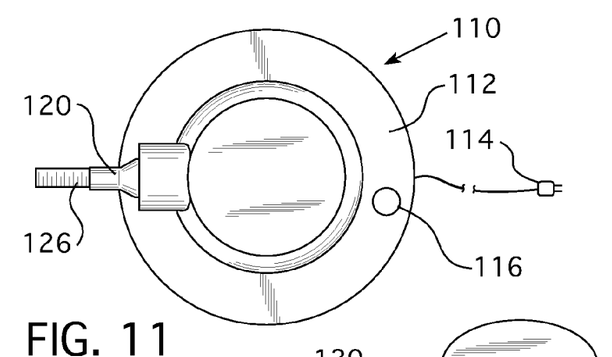
FIG. 11 is a top plan view of the vacuum device of FIG. 10.
Figure 12:
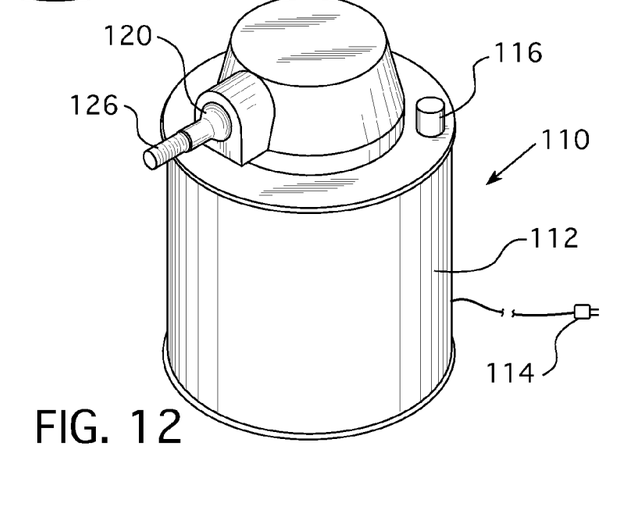
FIG. 12 is a perspective view of the vacuum device of FIG. 10.

Referring to FIGS. 10 through 12, there is shown a portable vacuum unit 110 which has, in the form shown, a generally cylindrical housing 112, which contains the motor and has an electrical wire 114 emerging therefrom, to provide a way of connecting the device to a source of electrical energy. It has, in the form shown, a rotary switch 116, which is positioned on an upper surface of the vacuum. A fitment 120 projects outwardly for securement to a hose, such as hose 102 shown in FIG. 9, to thereby provide a continuous air passageway between the hair-collecting end of the grooming tool 90 and the vacuum 110. A fitment 120 projects outwardly from the vacuum and receives, within its tubular projection, a hose 126, which is structured to be operatively associated with a grooming tool.

Figure 13:
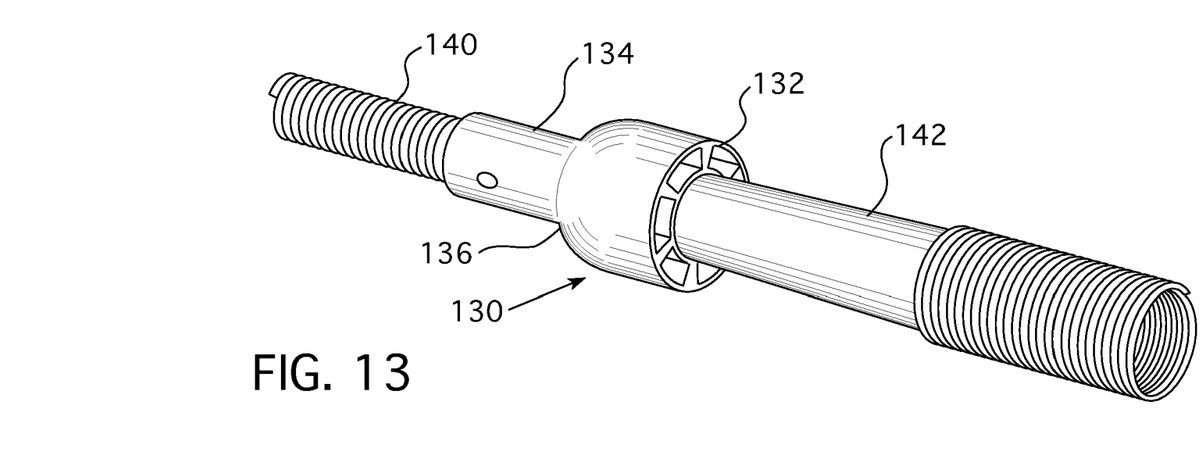
FIG. 13 shows a perspective view of a hose adapter of the present invention having two hoses secured thereto.
Figure 14:
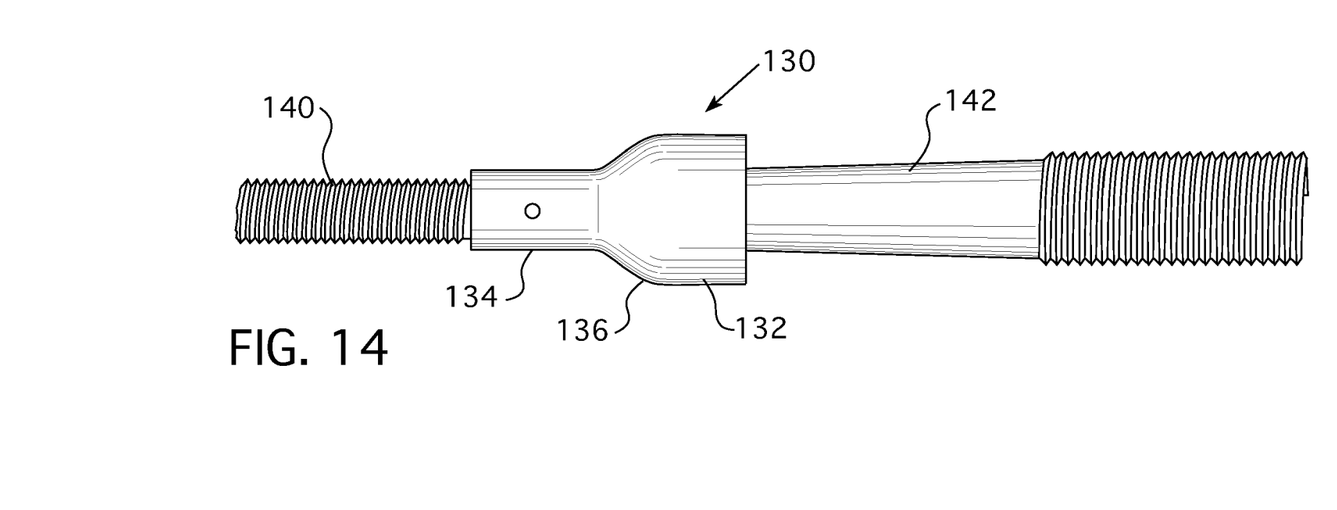
FIG. 14 is a front elevational view of a hose adapter of the present invention having two hoses secured thereto.

Referring to FIGS. 13 and 14, there is shown a hose adapter 130, which has a first connector portion 132, a second connector portion 134, and a transitional portion 136. A first hose 140, which is structured to be connected to a grooming device is inserted within second connector portion 134 and may be retained therein by frictional means or preferably by the means discussed hereinbefore in connection with FIGS. 2 and 4 and have its other end (not shown in this view) connected to the grooming device. A second hose 142 is received within and may be frictionally retained within first connector portion 132 and have its other end (not shown in this view) connected to the vacuum.

It will be noted that, in the form shown, the hose 140 has a helical wall which will enhance engagement with the ribs on the internal surface of the second connector portion 134. It is also noted that a portion of the larger diameter hose 142, which is inserted into the first connector portion 132, is generally smooth and provides surface-to-surface frictional contact with the interior surface of the first connector portion 132.

The hose adapter of the present invention preferably is substantially rigid and may conveniently be made of plastic, such as acrylonitrile-butadiene-styrene copolymer, polyvinyl chloride, or polystyrene, for example. In the alternative, a suitable metal, such as aluminum or steel, may be employed. The passageway dimensions will be determined by the dimensions of the hoses.

It will be appreciated that not only is a unitary, structurally-sound, effective hose coupler provided for use in a hose coupler assembly, but also the retention ribs enhance the interengagement between the hose and the coupler. Further, the vent opening and the adjustable closure provide additional flexibility in the use of the device and the degree of suction provided.

Whereas particular embodiments of the present invention have been described herein for purpose of illustration, it will be evident to those skilled in the art that numerous variations of the details may be made without departing from the invention as set forth in the appended claims.

What is claimed is:

1. A hose adapter assembly comprising
   a hose adapter defining a passageway therethrough and having a first connector portion and a second connector portion,
   a transition portion disposed between said first connector portion and said second connector portion,
   said first connector portion having an internal diameter which is larger in transverse dimension than the internal diameter of said second connector portion,
   a vacuum device operatively associated with at least one of said first connector portion and said second connector portion,
   a hose secured to the other of said first connector portion and said second connector portion, whereby said vacuum device is structured to draw air through said hose and said hose adapter and into said vacuum device, and
   said second connector portion having a plurality of individual generally inwardly projecting discrete ribs in engagement with said hose.

2. The hose adapter assembly of claim 1 including said hose adapter being made of a material selected from the group consisting of acrylonitrile-butadiene-styrene copolymer, polyvinyl chloride, or polystyrene.

3. The hose adapter assembly of claim 1 including said transition portion having a longitudinal extent of about ¾ inch to 1½ inches.

4. The hose adapter assembly of claim 1 including said first connector portion having longitudinal extent of about 1 inch to 1½ inches.

5. The hose adapter assembly of claim 1 including said second connector portion having longitudinal extent of about 1¾ inches to 2¼ inches.

6. The hose adapter assembly of claim 1 including
   said hose having an end portion structured to engage an animal grooming device, whereby animal hair freed by said animal grooming device will pass through said hose and said hose adapter to said vacuum device.

7. The hose adapter assembly of claim 1 including
   a second hose having a first end extending into and engaged with said first connector portion and a second end in engagement with said vacuum device.

8. A hose adapter assembly comprising
   a hose adapter defining a passageway therethrough and having a first connector portion and a second connector portion,
   a transition portion disposed between said first connector portion and said second connector portion,
   said first connector portion having an internal diameter which is larger in transverse dimension than the internal diameter of said second connector portion,
   a vacuum device operatively associated with at least one of said first connector portion and said second connector portion,
   a hose secured to the other of said first connector portion and said second connector portion, whereby said vacuum device is structured to draw air through said hose and said hose adapter and into said vacuum device,
   said second connector portion having a plurality of individual generally inwardly projecting discrete ribs in engagement with said hose, and
   said second connector portion having said ribs form a discontinuous thread.

9. The hose adapter assembly of claim 8 including
   said ribs being circumferentially and axially spaced from other said ribs.

10. The hose adapter assembly of claim 8 including said ribs defining a segmented thread.

11. The hose adapter assembly of claim 10 including
   said hose adapter having a vent opening,
   a generally radially-enlarged, annular frame surrounding said vent opening, and said vent closure being mechanically retained in said vent closed position by said radially-enlarged, annular frame.

12. A hose adapter assembly comprising
a hose adapter defining a passageway therethrough and having a first connector portion and a second connector portion,
a transition portion disposed between said first connector portion and said second connector portion,
said first connector portion having an internal diameter which is larger in transverse dimension than the internal diameter of said second connector portion,
a vacuum device operatively associated with at least one of said first connector portion and said second connector portion,
a hose secured to the other of said first connector portion and said second connector portion, whereby said vacuum device is structured to draw air through said hose and said hose adapter and into said vacuum device,
a vent opening in the wall of said second connector portion for adjusting the amount of vacuum being drawn through said hose adapter assembly,
a vent closure structured to have a first position with said vent open and a second position with said vent opening at least partially closed,
said vent closure being relatively movable with respect to said vent opening,
said vent closure being secured to said hose adapter so as to permit axial movement with respect to said hose adapter between said first position and said second position, and
said vent closure being a movable sleeve disposed on the exterior of said hose adapter.

13. A hose adapter assembly comprising
a hose adapter defining a passageway therethrough and having a first connector portion and a second connector portion,
a transition portion disposed between said first connector portion and said second connector portion,
said first connector portion having an internal diameter which is larger in transverse dimension than the internal diameter of said second connector portion,
a vacuum device operatively associated with at least one of said first connector portion and said second connector portion,
a hose secured to the other of said first connector portion and said second connector portion, whereby said vacuum device is structured to draw air through said hose and said hose adapter and into said vacuum device, and
said first connector portion having a pair of concentric walls and a plurality of relatively spaced, generally radially-oriented stiffening members secured to said concentric walls.

14. A hose adapter comprising
an adapter having a passageway therethrough,
a first connector portion and a second connector portion,
said first connector portion having an internal diameter which is substantially larger in transverse dimension than the internal diameter of said second connector portion,
a transition portion disposed between said first connector portion and said second connector portion, and
said second connector portion having a plurality of individual generally inwardly projecting ribs in engagement with said hose.

15. The hose adapter of claim 14 including
said hose adapter being made of a material selected from the group consisting of acrylonitrile-butadiene-styrene copolymer, polyvinyl chloride, or polystyrene.

16. The hose adapter of claim 14 including
said transition portion having longitudinal extent of about ¾ inch to 1½ inches.

17. The hose adapter of claim 14 including
said first connector portion having longitudinal extent of about 1 inch to 1½ inches.

18. The hose adapter of claim 14 including
said second connector portion having longitudinal extent of about 1¾ inches to 2¼ inches.

19. A hose adapter comprising
an adapter having a passageway therethrough,
a first connector portion and a second connector portion,
said first connector portion having an internal diameter which is substantially larger in transverse dimension than the internal diameter of said second connector portion,
a transition portion disposed between said first connector portion and said second connector portion,
said second connector portion having a plurality of individual generally inwardly projecting ribs in engagement with said hose and
said second connector portion having said ribs form a discontinuous thread.

20. The hose adapter of claim 19 including
said ribs being circumferentially and axially spaced from other said ribs.

21. The hose adapter of claim 19 including
said ribs defining a segmented thread.

22. A hose adapter comprising
an adapter having a passageway therethrough,
a first connector portion and a second connector portion,
said first connector portion having an internal diameter which is substantially larger in transverse dimension than the internal diameter of said second connector portion,
a transition portion disposed between said first connector portion and said second connector portion, and
a vent opening in the wall of said second connector portion for adjusting the amount of vacuum being drawn through said hose adapter,
a vent closure structured to have a first position with said vent open and a second position with said vent opening at least partially closed,
said vent closure being relatively movable with respect to said vent opening,
said vent closure being secured to said hose adapter so as to permit axial movement with respect to said hose adapter between said first position and said second position, and
said vent closure being a movable sleeve disposed on the exterior of said hose adapter.

23. A hose adapter comprising
an adapter having a passageway therethrough,
a first connector portion and a second connector portion,
said first connector portion having an internal diameter which is substantially larger in transverse dimension than the internal diameter of said second connector portion,
a transition portion disposed between said first connector portion and said second connector portion, and a vent opening in the wall of said second connector portion for adjusting the amount of vacuum being drawn through said hose adapter, a vent closure structured to have a first position with said vent open and a second position with said vent opening at least partially closed, said vent closure being relatively movable with respect to said vent opening, said vent closure being secured to said hose adapter, said vent closure being a movable sleeve disposed on the exterior of said hose adapter, a generally radially-enlarged, annular frame surrounding said vent opening, and said vent closure being mechanically retained in said vent closed position by said radially-enlarged, annular frame.

24. A hose adapter comprising an adapter having a passageway therethrough, a first connector portion and a second connector portion, said first connector portion having an internal diameter which is substantially larger in transverse dimension than the internal diameter of said second connector portion, a transition portion disposed between said first connector portion and said second connector portion, and said first connector portion having a pair of concentric walls and a plurality of relatively spaced, generally radially-oriented stiffening members secured to said concentric walls.

* * * * *

UNITED STATES PATENT AND TRADEMARK OFFICE
CERTIFICATE OF CORRECTION

PATENT NO.        : 8,113,543 B1
APPLICATION NO.   : 12/202481
DATED             : February 14, 2012
INVENTOR(S)       : Domenic A. Romani et al.

It is certified that error appears in the above-identified patent and that said Letters Patent is hereby corrected as shown below:

Column 5, line 57, "purpose" should read --purposes--.
Column 6, line 24, "having longitudinal" should read --having a longitudinal--.
Column 6, line 27, "having longitudinal" should read --having a longitudinal--.

Signed and Sealed this
Twenty-fourth Day of April, 2012

David J. Kappos
*Director of the United States Patent and Trademark Office*